United States Patent [19]

Elrick et al.

[11] 4,241,661

[45] Dec. 30, 1980

[54] COMPOSITE PROPELLANT WITH SURFACE HAVING IMPROVED STRAIN CAPACITY

[75] Inventors: Donald E. Elrick, Rawlings; Harry Gilbert, Cumberland, both of Md.

[73] Assignee: Hercules Incorporated, Wilmington, Del.

[21] Appl. No.: 781,285

[22] Filed: Dec. 4, 1968

Related U.S. Application Data

[63] Continuation-in-part of Ser. No. 667,623, Sep. 6, 1967, Pat. No. 3,948,698.

[51] Int. Cl.² .......................... F42B 1/00; C06B 45/10
[52] U.S. Cl. ...................................... 102/103; 102/99; 149/19.6; 149/19.9; 149/19.91
[58] Field of Search .............. 149/19.2, 103, 99, 19.6, 149/19.9, 19.91; 86/1; 102/103

[56] References Cited

U.S. PATENT DOCUMENTS

| | | | |
|---|---|---|---|
| 3,147,161 | 9/1964 | Abere et al. | 149/19 |
| 3,177,190 | 4/1965 | Hsieh | 260/94.2 |
| 3,305,523 | 2/1967 | Burnside | 149/19 X |
| 3,417,059 | 12/1968 | Hoffman | 149/19 X |

*Primary Examiner*—Edward A. Miller
*Attorney, Agent, or Firm*—Hazel L. Deming; Michael B. Keehan

[57] ABSTRACT

The invention is based on the discovery that when at least a part of the initial burning surface of an epoxy cured carboxy terminated rubber type composite propellant is coated with a propellant antioxidant material, an increase in resistance to oxidative hardening and an increase in strain capability is imparted to said surface. The invention provides (1) such a composite propellant coated at an initial burning surface with a propellant antioxidant in an amount sufficient to impart those unexpected improvements, (2) method involving coating the burning surface with the requisite amount of the propellant antioxidant material, and (3) a propellant rocket motor containing the above said propellant. When only a portion of the surface is subject to high strain, e.g. in slot areas, it is sufficient that only that portion of the burning surface be coated.

16 Claims, No Drawings

COMPOSITE PROPELLANT WITH SURFACE HAVING IMPROVED STRAIN CAPACITY

This application is a continuation-in-part of our co-pending application Ser. No. 667,623, filed Sept. 6, 1967, now U.S. Pat. No. 3,948,698.

This invention relates to composite epoxy cured rubber base propellants having improved resistance to oxidative hardening and improved strain retention properties at the initial burning surface, and to their manufacture. In another aspect, this invention relates to rocket motors containing the above described propellants.

Solid propellant compositions, as propellants for projectiles, are fast burning oxidizer-fuel systems comprising a solid oxidizer, and a binder system to support the propellant ingredients uniformly throughout the propellant mass and to also serve as a fuel. Upon incorporation of all ingredients into the final propellant mixture, it (the propellant mixture) is maintained under time and temperature curing conditions to form the finished propellant product.

Composite type propellants are rubber based and contain natural rubber, or synthetic rubber polymers or copolymers as the binder component. The binder, or binder system, as it may be referred to, comprises not only the rubbery base material but also all associated ingredients to enable it to function in that capacity such as a suitable plasticizer, curing agent, catalyst when needed for curing, setting agent, antioxidant, and the like. In some instances suitable filler materials are utilized, i.e. reinforcing agents as, for example, carbon black, clays, silica, burning rate catalysts, and the like. These materials along with the oxidizer component of the propellant are dispersed evenly throughout the rubbery binder component and upon curing the mixture all ingredients are evenly dispersed throughout the gel network. Curing is generally carried out after the final ingredient mixture has been emplaced in a suitable mold so that upon completion of the curing reaction the propellant is in the desired shape for use.

In our parent application we have disclosed and claimed epoxy cured carboxy terminated rubber base composite propellants, and method for their manufacture; in our copending application, Ser. No. 736,929, filed June 4, 1968, now U.S. Pat. No. 3,982,975, a continuation-in-part of said parent, such composite propellants containing selected phenylenediamine antioxidant components are disclosed and claimed; in our copending application, Ser. No. 781,283, filed Dec. 4, 1968, now U.S. Pat. No. 3,984,265, a continuation-in-part of said parent, epoxy cured carboxy terminated rubber base composite propellants containing certain synergistic antioxidant mixture components, and antioxidant components, per se, are disclosed and claimed; and in our copending application Ser. No. 781,282, filed Dec. 4, 1968 a continuation-in-part of said parent are disclosed and claimed functionally terminated rubber base propellants and rocket motors containing same, and manufacture, said propellants having a varied cross-link density to impart improved strain capabilities and propellant strength.

In the radial burning of propellants, mass ratio, i.e. the ratio of the propellant weight to the total weight of the motor, is one factor which determines the amount of total thrust and total energy output and the strain that is imposed on the port surface area of the propellant due to pressurization upon burning and differences between cure temperature and the lowest temperature the motor will encounter. In the past, mass ratio in composite propellants has been unduly limited by a lack of sufficient strain capability of the propellant at the initial burning surface in face of strains inherent from cure and cycling temperatures and the strains imposed during burning. Thus, attempts to improve total thrust by increase of mass ratio have led to failure in propellant structure due to excessive strains on the initial burning surfaces. Another problem encountered in the firing of case bonded rocket motors of the composite propellant type has been the integrity of the case bond, which upon failure leads directly to faulty ballistics.

Cross-link density, i.e., degree of cross-linking of the rubber base of the binder component, in composite propellants, is one factor which determines strain capability, tensile strength and modulus of the propellant. Attainment of optimum strain capability at the initial burning surface and high tensile strength throughout the remainder of the propellant cannot be accomplished at one and the same cross-link density. Thus, at the initial burning surface, optimum strain capability usually requires sacrifices in tensile strength and modulus, whereas high tensile strength and modulus throughout the remainder of the propellant mass usually requires sacrifice in elongation. Standard manufacturing procedures give uniform cross-link density throughout the propellant mass. Accordingly, a compromise cross-link density level is used in propellant formulations in each application. That level must be sufficiently low to provide suitable mechanical properties for an acceptable degree of strain capability at the initial burning surface, but still sufficiently high to provide an acceptable degree of tensile strength and modulus throughout the remainder of the propellant to assure integrity of the propellant mass and particularly to assure a case bond of adequate strength in case bonded composite propellant rocket motors. The result of such standard practice has been a compromise of propellant properties at the expense of both optimum strain capabilities and the high strengths that have been potentially available but have not been accomplished heretofore.

Oxidative hardening of propellants occurs primarily at the initial burning surface and causes reduction in strain capability and an increase in modulus. The loss in strain capability can lead to physical failure of the propellant during cycling or upon initial burning, with the resulting impaired ballistics.

In our parent application, we have disclosed and claimed composite, i.e. rubber based, propellants in which the binder is formed from a carboxy terminated rubber and an epoxide curing agent. The binder component is formed by reacting the carboxy terminated rubber with a curing agent consisting of a mixture of difunctional epoxides and trifunctional epoxides wherein the mole ratio of the dioxide to trioxide introduced into the formulation is in the range of 15:1 to 1:1. The reaction is carried out in the presence of a curing catalyst of the group of chromium salts of aliphatic carboxylic acids containing from 2 to 22 carbon atoms, chromium naphthenate, and vanadium naphthenate, the ratio of epoxy groups to carboxyl grups in the binder forming mixture being substantially in stoichiometric proportions.

Also, as disclosed in our parent application, supplemental propellant ingredients, employed in the art in making composite propellants include such as oxidation inhibitors, reenforcing agents, setting agents, surfactants, ballistic modifiers, burning rate modifiers, metal fuels, plasticizers, and the like. The carboxy terminated rubber, per se, generally of necessity, contains an antioxidant added before or at the time of its recovery from the reaction mixture in which it is formed, and, by its presence in the finished product imparts an oxidation inhibiting action to the propellant. Generally, an additional portion of the same or another antioxidant is added to the propellant mixture during the mixing procedure to impart further antioxidant action to the finished propellant.

We have discovered that in rubber based propellants in which the binder material comprises an epoxide cured carboxy terminated rubber, such as described in our abovesaid parent application, aging characteristics and strain capabilities at the initial burning surface, and tensile strength throughout the remainder of the propellant mass, can be markedly improved by a coating of propellant antioxidant to the initial burning surface of the cured propellant mass, to thereby not only substantially improve elongation normally subject to undue oxidation at the burning surface, but to permit preparation of motors having an improved mass ratio by providing for high strain capability at the port area of the propellant and high modulus and tensile strength throughout the remainder of the propellant mass.

In accordance with the invention, a composite propellant is provided which comprises a carboxy terminated rubber cured with an epoxide curing agent therefor, as the binder system, and a coating of a propellant antioxidant material on at least a portion of the initial burning surface of said propellant in a sufficient amount to impart to said burning surface an increase in strain capability and an increase in resistance to oxidative hardening. Further in accordance with the invention, a method for manufacture of an improved composite propellant is provided which comprises coating at least a portion of the initial burning surface of a composite propellant, of which the binder component comprises a carboxy terminated rubber cured with an epoxide curing agent therefor, with a propellant antioxidant material in sufficient amount to impart to said burning surface an increase in strain capability and an increase in resistance to oxidative hardening.

The invention although applicable to propellants in any suitable system is in preferred practice applied to case bonded composite propellant rocket motors, and in preferred embodiments thereof is concerned with resistance to oxidative hardening and improved strain capabilities imparted at the initial burning surface and improved tensile strength throughout the remainder of the propellant to facilitate improved support between the propellant mass and the case bond.

In preferred practice the composite propellants of the invention contain on a weight basis from about 60–90 percent solid oxidizer and from 5–20 percent binder. More preferably the propellant compositions contain about 70–90 percent solid oxidizer, from about .5 to about 10 percent metal fuel and from about 5–20 weight percent binder component. From about 40 to about 95 weight percent of the binder in preferred formulation is the carboxy terminated rubber, and from about 1 to about 10 weight percent is the epoxide curing agent, while the plasticizer can be from about 0 to about 50 weight percent, and preferably from about 20–40 percent by weight of the binder.

Any suitable propellant antioxidant material can be added to the composite propellant initial burning surface as a stain, or coating, in practice of the invention. Exemplary of such propellant antioxidant materials are N-substituted p-phenylenediamines as for example (1) normal or isomeric N,N'-dialkyl-p-phenylenediamines containing from 4–10 carbon atoms in each alkyl group such as N,N'-bis(1,5-dimethylpentyl)-p-phenylenediamine, N,N'-diheptyl-p-phenylenediamine, N,N'-bis(1-methylheptyl)-p-phenylenediamine, N,N'-di sec octyl-p-phenylenediamine, and N,N'-bis(1-ethyl-3-methylpentyl-p-phenylenediamine, (2) N,N'-di-phenyl p-phenylenediamine, (3) N-alkyl, N--phenyl p-phenylenediamines such as N-isopropyl, N'-phenyl-p-phenylenediamine and N-sec-butyl N'-phenyl-p-phenylenediamine, (4) N-cycloalkyl-N'-phenyl-p-phenylenediamines containing from 4–10 carbon atoms in the cycloalkyl group such as N-cyclohexyl-N'-phenyl-p-phenylenediamine, and (5) N,N'-dimethyl-N,N'-bis(alkyl)-p-phenylenediamines containing from 4–10 carbon atoms in each alkyl group such as N,N'-dimethyl-N,N'-bis(1-methylheptyl)-p-phenylenediamine; phenyl-$\beta$-naphthylamine; thiophenylamine; tetramethyl thiuramdisulfide; 4,4'-thiobis(6-tert-butyl meta cresol); 8-hydroxylquinoline; and Polygard, i.e. alkylated phosphites.

Generally, a mixture of such propellant antioxidants is advantageously utilized as an antioxidant stain (or coating) material such as for example the antioxidant stain mixture illustrated in Example 2, viz., a mixture of phenyl-$\beta$-naphthylamine, N,N'-bis(1,4-dimethylpentyl)-p-phenylenediamine, 4,4'-thio bis (6-tert-butyl meta cresol) and 8 hydroxyquinoline. Other propellant antioxidant mixtures include, for example, a mixture of phenyl-$\beta$-naphthylamine, 4,4'-thio bis (6-tert-butyl meta cresol), and 8 hydroxyquinoline; N,N'-bis(1,4-dimethylpentyl)-p-phenylenediamine, phenyl-$\beta$-naphthylamine and thiodiphenylamine, and the like. A multicomponent mixture of at least two different types of antioxidants such as a mixture of a free radical decomposer such as phenyl-$\beta$-naphthylamine, and a hydroperoxide group decomposer such as 4,4'-thio bis(6-tert-butyl meta cresol), often with a chelating agent is advantageously utilized. In any such antioxidant mixture it is generally preferred that the content of each individual antioxidant (and chelating agent when utilized) be at least about 8–10 weight percent of the total antioxidant mixture.

The amount of antioxidant applied to the burning surface is dependent not only upon the particular composite propellant composition but also on the antioxidant material selected and the degree of change in mechanical properties sought. However, in general practice an amount of antioxidant material is applied to the initial burning surface to provide an antioxidant coating, or stain, by applying generally from 5 to $100 \times 10^{-4}$, and preferably 10 to $50 \times 10^{-4}$, grams of antioxidant coating material (solvent free) per square centimeter of initial burning surface.

The coating is advantageously applied as a solution in a solvent sufficiently volatile so as to be easily removed, by evaporation, after application to the burning surface. Exemplary of suitable solvents for forming the coating, or stain, solution are benzene, tetrahydrofuran, toluene, methylene chloride and chloroform; of which benzene, tetrahydrofuran and chloroform are preferred due to their vapor pressures which are particularly suitable for evaporation of the solvent from the initial burning surface. It is advantageous that the solvent for the propellant antioxidant material be a nonsolvent for the oxidizer component of the propellant, and that the solubility of the solid oxidizer in the antioxidant solvent be generally not more than 0.2 percent. The concentration of propellant antioxidant in the resulting solution is advantageously within the range of about 5–40 weight percent although concentrations outside that range can be utilized when desired.

In now-preferred practice of process of the invention, the propellant ingredients are admixed and generally cured while supported in a suitable mold which serves as the casing for the cured propellant. Under such curing conditions, the inner wall of the intended casing is coated with a lacquer type material which, during the curing step becomes bonded to the propellant and hence the term "case bonded propellants". Bonding a propellant to casing is required in order to preclude burning of the propellant along the grain surface adjacent the casing, which would disturb the burning equilibrium and greatly impair the ballistics. In the manufacture of case bonded propellants, the initial burning surface is generally that forming a port area within the propellant for uniform radial burning, and is formed by suitable configuration molding equipment during curing. In such practice, the antioxidant coating material, in accordance with the invention, is applied to all of the propellant surface forming the port area, i.e. to the port wall, or to merely the port surfaces in which strains are highest, such as the slot areas.

When utilizing the propellant as a component of a case bonded propellant motor assembly, the antioxidant coating permits initial cure of the entire propellant mass to a degree higher than that permissible when utilizing the "compromise" cross-link density value of the prior art so that the tensile strength of the entire mass has been increased to a value higher than that permitted by the prior art's compromised cross-link density values. The antioxidant coating on the burning surface serves to inhibit oxidative hardening and to that extent it precludes undue loss in elongation characteristics at the burning surface and hence retains strain capability. The applied antioxidant material, in numerous instances, functions also as a plasticizer agent at the burning surface to thereby impart an increase in elongation value and decrease in modulus. However, these factors do not fully account for the increase in strain capability imparted to the burning surface. We have found that when curing the entire propellant mass to a cross-link density value higher than that normally contemplated and which would impair strain capabilities under normal conditions, the coating applied, as described, to the burning surface, markedly improves strain capability so as to permit the initially high degree of cross-link density without serious impairment of the finally established strain capability, i.e. as result of the presence of the coating on the initial burning surface. Accordingly, by providing higher tensile strength in the mass of propellant, without adverse effect on strain capability at the burning surface, higher mass ratios can be utilized with accompanying increase in total thrust and total energy output; and increased mass ratio can be readily accomplished by maintaining the standard propellant dimension except for reduction of the port cross-section.

In other embodiments of composite propellant rocket motors, it is not required that mass ratio be increased beyond that normally utilized. However, in all embodiments of the invention, the applied coating of antioxidant material serves to inhibit oxidative hardening and increase strain capability at the initial burning surface to provide integrity of the burning system; and it is often not required that the entire initial burning surface be coated with the antioxidant, it being generally preferable to coat only that portion of the initial burning surface subject to a concentration of strain. By way of illustration the Advanced Sparrow motor has an outside diameter of 8 inches, an inside diameter of 2.25 inches and slot diameters of 5.8 inches; and strains due to cool-down from a cure temperature of 140° F. to a $-70°$ F. operational level are concentrated in the slot areas and amount to about 17 percent at the $-70°$ F. level. An antioxidant stain solution, such as that of Example 2, applied to those slot areas, even without application to the remainder of the burning surface, assures integrity of the burning system at a high mass ratio, even though the motor is repeatedly cycled from $-65°$ to 165° F., is subjected to hot vibrational testing between cycles and is fired at $-65°$ F.

The finished propellant of the invention in most embodiments contains one or more additional materials such as a metal fuel and ingredients commonly employed in making composite propellants such as reinforcing agents, wetting agents, surfactants, ballistic modifiers, radar attenuators, burning rate modifiers and the like. The propellant is prepared by intimately blending or mixing the ingredients using conventional techniques and standard equipment well known to those skilled in the art as suitable for the purpose. If desired, the addition of the catalyst to the mixture can be delayed until just prior to curing. The latter method offers the distinct advantage of giving a stable mixture which can be stored indefinitely up until the time it is needed.

The curing of the composition is conducted in the presence of the catalyst at any temperature, usually 0° to 100° C., the only effect of temperature variation being to increase or decrease the rate of reaction. It is preferred to carry out the cure at temperatures in the range of about 50° to 80° C.

The epoxide curing agent in preferred practice is a mixture of difunctional epoxides and trifunctional epoxides and the curing reaction is carried out in the presence of a curing catalyst, both also disclosed in the abovesaid application.

The carboxy terminated rubber component of the binder, in preferred practice, is an elastomeric polymer containing on the average about 2 free carboxyl groups per polymer molecule and is preferably a homopolymer of an olefin such as isobutylene or a conjugated diene containing 4 to 8 carbon atoms, such as butadiene-1,3, isoprene, octadiene-1,3, and the like, a copolymer of more than 1 olefin or conjugated diene, such as an ethylene-propylene copolymer, a copolymer of a conjugated diene with other copolymerizable monomers which are preferably vinyl-substituted aromatic compounds such as styrene, the 1- or 2-vinyl naphthalenes and their alkyl, aryl, alkoxy, cycloalkyl, alkaryl, aralkyl, aryloxy, and dialkyl amino derivatives, or a mixture of any of the above homopolymers or copolymers.

The carboxy terminated rubbers can be produced in known manner from the above monomers, as, for example, by carrying out the polymerization in the presence of, as initiators, organoalkali metal compounds of the formula $RnM_2$, where R is an aliphatic, cycloaliphatic, or aromatic hydrocarbon radical, M is an alkali metal such as sodium, potassium, lithium, cesium, or rubidium, and n is 2 to 4, and then replacing the alkali metal atoms on the ends of the polymer molecule with COOH groups by reacting with carbon dioxide and then hydrolyzing. Polymers containing 2 or more carboxyl groups per polymer molecule can be prepared by polymerizing an unsaturated carboxylic acid containing a single carbon to carbon double bond, such as acrylic, methacrylic, itaconic, vinyl acetic, oleic, fumaric, maleic, and like acids with itself or with a different copolymerizable monomer such as for example a different unsaturated acid, an olefin or a conjugated diene, according to any of the known methods.

The carboxy terminated rubbers which are particularly useful in practice of this invention are the carboxy terminated polymers of butadiene and isobutylene, and have molecular weights ranging from about 1,000 to about 20,000, and preferably from about 1500 to about 10,000.

The binder system of the invention is, in preferred practice, the polymeric binder formed by curing, in the presence of certain metal salts, which are catalysts for the carboxyl-epoxide reaction, the carboxy-terminated rubber with an all-epoxide curing agent which is a mixture of diepoxides and triepoxides having a diepoxide:triepoxide mole ratio of from about 15:1 to 1:1, and preferably from 3:1 to 1:1. Maintenance of the ratio of the difunctional epoxides to the trifunctional epoxides within the above ranges is important to the production of propellants having a satisfactory mechanical property balance since below the ratio of 1:1 the propellant elongation is low, and above the ratio of 15:1 the propellant tensile strength is low.

The diepoxides of the mixture contain two epoxide groups per molecule and are the saturated or unsaturated aliphatic, cycloaliphatic, aromatic, or heterocyclic diepoxides which also contain, is desired, non-interfering substituents. Preferred diepoxides are the aliphatic diepoxides containing 4 to 30 carbon atoms, the cycloaliphatic diepoxides containing 12 to 40 carbon atoms and the diglycidyl ethers of dihydric phenols. Typical diepoxides include butadiene dioxide; 1,2,5,6-diepoxyhexane; diglycidyl ether; diglycidyl ether of 1,3-butanediol; 1,8-bis(2,3-epoxypropoxy) octane; 1,4-bis (2,3-epoxypropoxy) cyclohexane; 1,4-bis(3,4-epoxybutoxy)-2-chlorocyclohexane; the di(epoxycyclohexanecarboxylates) of aliphatic diols exemplified by the bis (3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol; the oxyalkylene glycol epoxycyclohexanecarboxylates exemplified by bis(2-ethylhexyl-4,5-epoxycyclohexane-1,2-dicarboxylate) of dipropylene glycol, bis (3,4-epoxy-6-methylcyclohexanecarboxylate) of diethylene glycol and bis (3,4-epoxycyclohexanecarboxylate) of triethylene glycol; the epoxycyclohexylalkyl epoxycyclohexanecarboxylates exemplified by 3,4-epoxycyclohexylmethyl 3,4-epoxycyclohexanecarboxylate, 3,4-epoxyl-1-methylcyclohexylmethyl 3,4-epoxy-1-methylcyclohexanecarboxylate, 3,4-epoxy-2-methylcyclohexylmethyl 3,4-epoxy-2-methylcyclohexanecarboxylate, 3,4-epoxy-6-methylcyclohexylmethyl 3,4-epoxy-6-methylcyclohexane-carboxylate, (1-chloro-3,4-epoxycyclohexan-1-yl) methyl 1-chloro-3,4-epoxycyclohexanecarboxylate, (1-bromo-3,4-epoxycyclohexan-1-yl) methyl 1-bromo-3,4-epoxycyclohexanecarboxylate and (1-chloro-2-methyl-4,5-epoxycyclohexane-1-yl) methyl 1-chloro-2-methyl-4,5-epoxycyclohexanecarboxylate; epoxycyclohexylalkyl dicarboxylates exemplified by bis (3,4-epoxycyclohexylmethyl) pimelate and oxalate and bis (3,4-epoxy-6-methylcyclohexylmethyl) maleate, succinate, sebacate and adipate; epoxycyclohexylalkyl phenylene-dicarboxylates exemplified by bis (3,4-epoxycyclohexylmethyl) terephthalate; bis(3,4-epoxy-6-methylcyclohexylmethyl) diethylene glycol ether; vinyl cyclohexene dioxide; diepoxide of dicyclohexene; dicyclopentadiene dioxide; bis (2,3-epoxycyclopentyl) ether; glycidyl 2,3-epoxycyclopentyl ether; 2,3-epoxycyclopentyl 2-methylglycidyl ether; 1,2,5,6-diepoxy-3-hexyne; 1,3-bis(2,3-epoxypropoxy) benzene; 1,4-bis (2,3-epoxypropoxy)benzene; 1,3-bis(4,5-epoxy-pentoxy)-5-chlorobenzene; 4,4'-bis(2,3-epoxypropoxy) diphenylether; 2,2-bis (2,3-epoxypropoxyphenyl) methane; 2,2-bis[p-(2,3-epoxy-propoxy) phenyl] propane, i.e., the diglycidyl ether of bisphenol A; quinoline diepoxide and the like, as well as mixtures thereof.

The triepoxides of the mixture contain three epoxide groups per molecule and are aliphatic, cycloaliphatic or aromatic triepoxides. Preferred triepoxides are the triepoxyalkanes containing 6 to 25 carbon atoms; the tri(epoxycyclohexane carboxylates) and the triglycidylethers of trihydric alcohols such as glycerol, 1,1,1-tri(hydroxymethyl) propane, 1,2,6-hexanetriol and the higher alcohols containing up to about 25 carbon atoms; and the triglycidyl ethers of trihydric phenols, such as phloroglucinol, the trihydroxydiphenyl methanes and propanes, the trihydroxyaminophenols, the trisphenols; and the like as well as mixtures thereof. Typical triepoxides include triepoxyhexane; triepoxydecane; 2,3,6,7,11,12-triepoxydodecanl; 2,3,5,6-diepoxy-9-epoxyethyldodecane; tris(3,4-epoxycyclohexanecarboxylate) of 1,1,1-trimethylol propane; tris(3,4-epoxycyclohexanecarboxylate) of 1,2,3-propanetriol; 2,2[2,4,4'-tris(epoxypropoxy) diphenyl] propane; 1,1-bis(glycidyloxymethyl)-3,4-epoxycyclohexane; N,N,O-tris(epoxypropyl) p-aminophenol; and the like. Epoxide mixtures containing the diglycidyl ethers of bisphenol A and the triepoxides of the aminophenols are particularly preferred.

For best results, both the diepoxide and the triepoxide of the mixture will be in the relatively pure state, i.e., having a purity of about 95 to 100 percent in order that all of the available carboxy groups of the rubber will be incorporated into the gel network without wastage of any appreciable number of polymer chains as dangling ends which do not contribute to the gel network.

The ratio of the epoxy groups in the epoxide mixture to the carboxyl groups of the rubber in the binder should be in substantially stoichiometric proportions. Although a slight excess of either is not harmful, it is preferred that a slight excess of epoxy groups over carboxyl groups be present in the binder, generally at an equivalent's ratio of epoxy groups to carboxy groups within the range of from 0.9:1 to 2:1.

The reaction of the carboxy terminated rubber with the above described epoxide mixture requires the presence of a catalyst which promotes the carboxyl-epoxide reaction. Catalysts of this type must also have high activity in the presence of the other propellant ingredients, and must not adversely affect the desirable properties of the cured propellant, as by side reactions. The catalysts which have been found to fit all of the above requirements are chrominum salts of aliphatic carboxylic acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium stearate, chromium oleate, chromium naphthenate and vanadium naphthenate. The amount of catalyst necessary to promote the reaction will, of course, depend on many factors, as for example, on the particular salt employed, the binder materials and other propellant ingredients present and the cure rate desired. In general, the amount utilized will vary from a very small catalytic amount up to about 0.1 percent of the propellant composition and preferably will be from about 0.005 percent to about 0.03 percent by weight of the composition.

The solid oxidizer component of the propellants of the invention is preferably an inorganic oxidizing salt, a number of which are well known in the art. Typical of such inorganic salts are the ammonium, alkali metal, or alkaline earth metal salts of nitric, perchloric, or chloric acids or mixtures thereof, and particularly such salts as ammonium perchlorate, sodium perchlorate, potassium perchlorate, magnesium perchlorate, lithium chlorate, stronitium chlorate, potassium nitrate, sodium nitrate, calcium nitrate, ammonium nitrate, and the like. Other solid oxidizers such as cyclotetramethylene tetranitramine, cyclotrimethylene trinitramine, nitroguanidine, and the like, can be substituted for all or part of the inoganic oxidizing salt, if desired.

In utilization of propellants of the invention as components of a case bonded propellant motor, any suitable rocket motor casing of the prior art can be utilized. However, wound filament type casings are particularly advantageously utilized in view of their light weight and high tensile strength. Any suitable bonding lacquer at the casing inner wall surface can be utilized as for example a carboxy terminated polybutadiene cured with 1.3 equivalents of a triepoxide catalyzed with chromium octanoate and filled with 2 percent of a thixotropic agent such as Cab-O-Sil (a finely divided silica) and other modifications of that recipe.

In other embodiments, the invention is particularly applicable to caseless rocket motors inasmuch as the increase in tensile strength imparted to the propellant mass without impairment of the stain capability at the burning surface contributes to increased tensile strength of the motor body and hence to increased stability in respect of resistance to physical failure and assurance of optimum burning characteristics. Thus, the mass ratio of caseless rocket motors can be further improved by decreasing the port diameter. The invention in like manner is applicable to cartridge loaded grains, which normally have relatively large port diameters to provide high modulus and tensile strength to satisfy handling requirements.

Usually motors contain propellants which are plasticizers and a "compromise" cross-like density to have uniform mechanical properties such as 400–1000 psi modulus, 80 to 150 psi tensile strength and 30–40 percent elongation.

When it is desired to increase the cross-link density to a degree above the "compromise" level described hereinabove, a modulus in the order of from 700–2000 psi, tensile strength of 120–250 psi, and elongation in the order of from 10–30 percent is obtained at 77° F. At the end of the cure those properties also characterize the burning surface of the propellant and strain capability is at best marginal. However, by applying the coating of antioxidant material, elongation is increased and modulus and tensile strength decreased to provide desirable mechanical properties to the initial burning surface. As described hereinabove this effect is in part due to a plasticizing action of the antioxidant coating, and to an extent to the inhibited oxidative hardening. However, a substantial portion of the effect of the coating is the result of a mechanism not fully understood. For example, when a propellant mass with a relatively high cross-link density is considered, elongation within the range of from 20–30 percent and modulus within the range of from 800–1500 psi can be respectively increased and reduced to values within the range of from 30–45 percent and 500–1000 psi at the burning surface by applying a coating of suitable antioxidant in an amount in the order of from about 2 to $5 \times 10^{-3}$ grams per square centimeter. The changes in properties are considerably greater than can be obtained by merely coating the surface with a plasticizer.

The invention is further illustrated with reference to the following examples, all parts and percentages set forth therein being on a weight basis.

EXAMPLE 1

Nine basic formulations, viz. Nos. A–H, and J inclusive where prepared for testing as controls, and in modified form, for mechanical properties in the evaluation of various antioxidant coatings on propellant initial burning surfaces.

In the preparation of basic formulation A, the binder system (Binder I, see Table IA) was prepared by forming a solution of 0.12 part chromium 2-ethyl hexanoate having a chromium content of 10.9 percent, in 64.56 parts of a carboxy terminated polybutadiene having a molecular weight of about 5000, a specific gravity value of about 0.91 g./ml. at 60/60° F., a visocity of 300 poises at 77° F. and a carboxyl content of about 0.033 equivalents per 100 grams polymer. The carboxylated polybutadiene contained 1.3 percent of 2.2'-methylene-bis(4-methyl-6-tert-butyl)phenol added as an antioxidant during its recovery from the reaction mixture in which it was formed, i.e. prior to its utilization as a binder component and thus inherently present in the carboxylated polybutadiene prior to incorporation of the latter into the propellant.

The epoxide curing agent, for reaction with the carboxy terminated polybutadiene, was then added with stirring together with 16 parts of dioctyl adipate and 15.88 parts of a liquid polybutadiene as plasticizers for the binder. The epoxide curing agent was composed of a mixture of 2.98 parts DER-332 (the condensation product of bisphenol A and epichlorohydrin) and 0.46 part ERL-0510 (N,N,O-tris(epoxypropyl)p-aminophenol) and the resulting epoxide:COOH equivalency was 1.00.

The basic propellant formulation A was prepared in a Baker Perkins vertical mixer (driven by an air motor and heated to 65° C. by water) by mixing the above described binder solution in the order given with 5 percent powdered aluminum (average particle size of 10 microns), micro atomized ammonium perchlorate (average particle size, 10 microns), unground ammonium perchlorate (average particle size, 200 microns) and spherical ammonium perchlorate (average particle size, 400 microns), in respective proportions of about 20:32:31 to produce a total of 83 percent trimodal ammonium perchlorate.

After a total mixing period of 45 minutes, the resulting slurry was transferred to a wax coated cardboard container, the inside length, width and height dimensions of which were $4'' \times 1\frac{1}{4}'' \times 6''$ respectively, and therein deaerated in a vacuum desiccator at about 75° C. to a pressure of 1 mm. for 30 minutes followed by curing in a forced air ovn at 60° C.

Basic formulation B was prepared in accordance with the general procedure above described with reference to formulation A except that the epoxide content was slightly higher, the polybutadiene content was correspondingly lower and the epoxide to carboxyl ratio was slightly higher. Basic formulation C was prepared in accordance with procedure described above with reference to formulation A, except that the carboxy terminated polybutadiene and epoxide concentrations were slightly higher, the DOA and polybutadiene concentrations were correspondingly lower and the solids contents were modified as the Table I. Basic formulation D was prepared in accordance with procedure described above with reference to formulation C except that solids contents were modified as in Table I. Basic formulation E was prepared in accordance with procedure described above with reference to formulation D, except that the DOA content was increased, polybutadiene content was decreased, antioxidant was added and additional triepoxide was used as shown in Table 1A; and the $Fe_2O_3$ content increased and 200μAP content decreased, as shown in Table 1. Basic formulation F was prepared in accordance with procedure described above with reference to formulation C, except that solids contents were modified as in Table 1. Basic formulation G was prepared in accordance with procedure described above with reference to formulation C, except that solids contents are as shown in Table 1. Basic formulation H was prepared in accordance with procedure described above with reference to formulation C, except that solids contents are as shown in Table 1. Basic formulation J was prepared in accordance with procedure described above with reference to formulation E, except that solids contents were modified as in Table 1.

Basic formulations A-H and J, prepared as above described, are summarized in Table 1 and 1A following.

TABLE 1

| Propellant Composition, Weight Percent | | | | | | | | | |
|---|---|---|---|---|---|---|---|---|---|
| | A | B | C | D | E | F | G | H | J |
| AP* (400μ) | 31 | 31 | 31 | 31 | 31 | 57 | 57 | 57 | 57 |
| AP (200μ) | 32 | 32 | 8 | 19.5 | 19 | 10 | 10 | 10 | 10 |
| AP (50μ) | — | — | 40 | 30 | 30 | 3 | 3 | 5 | 5 |
| AP (10μ) | 20 | 20 | — | — | — | — | — | — | — |
| Al (10μ) | 5 | 5 | 6 | 6 | 6 | — | — | — | — |
| Al (30μ) | — | — | — | — | — | 10 | 10 | 10 | 10 |
| $Fe_2O_3$ | — | — | 2 | 0.5 | 1 | — | — | — | — |
| $MoO_3$ | — | — | — | — | — | 1 | 1 | 1 | 1 |
| Oxamide | — | — | — | — | — | 6 | 6 | 4 | 4 |
| Binder I** | 12 | 12 | 13 | 13 | — | 13 | 13 | 13 | — |
| Binder II** | — | — | — | — | 13 | — | — | — | 13 |

*AP = Ammonium Perchlorate
**See Table 1A for composition of binder systems I and II; binder system I slightly varied for compositions B, C, D, F, G and H as described immediately preceding Table 1.

TABLE 1A

| Binder Composition, Weight Percent | | |
|---|---|---|
| Ingredients | Binder I | Binder II |
| Carboxy Terminated Polybutadiene (CTPB) | 64.56 | 66.34 |
| DER-332 | 2.98 | 3.18 |
| ERL-0510 | 0.46 | 1.09 |
| DOA[1] | 16.00 | 22.00 |
| PBD[2] | 15.88 | 4.27 |
| Chromium octanoate | 0.12 | 0.12 |
| Antioxidant[3] | — | 3.0 |
| Epoxy/COOH ratio | 1.00 | 1.30 |

[1] dioctyl adipate
[2] liquid polybutadiene
[3] 1 percent each of N,N'-bis(1,4-dimethylpentyl)-p-phenylenediamine (AO-443), phenyl β-naphthylamine (PBNA), and thiodipenylamine (TDPA).

EXAMPLE 2

Dumbbell type test strips were machined from an exteriormost portion of a block of each of cured propellants B, D, E, H and J. The test strips were Type 2 JANAF of 2.7" effective gauge length, 0.36 to 0.37 " gauge width, ½" radius and ¼ to ½" thick and were tested, both stained at the surface with an antioxidant, and unstained, for modulus, tensile strength, and elongation at maximum stress at 77 and 170° F. In such instance the antioxidant stain was a solution of 7 percent PBNA, 7 percent A0-443, 7 percent Santowhite, (4,4' thiobis(6-tert-butyl-meta-cresol), and 2 percent 8 hydroxyquinoline (8HQ) in benzene and was applied by dipping the dumbbell strip in the stain solution for 2 seconds followed by removal from the solution and air drying and then subjecting each specimen to reduced pressure in the order of from 1–5 mm. at about 35° C. for 3–8 hours. In each instance about $2 \times 10^{-3}$ grams of residual antioxidant coating was applied per square centimeter of dumbbell strip surface. The results of the tests are summarized by the data of Table 2 following:

TABLE 2

Effect of Antioxidant Stain[1] on Initial Propellant Strain Capabilities as Shown by Mechanical Properties

| | | Measured at 77° F.; 0.74 min.$^{-1}$ [2] | | | Measured at 170° F., 0.0074 min.$^{-1}$ [2] | | |
|---|---|---|---|---|---|---|---|
| Test No. | Formulation[3] | Modulus psi | Tensile Strength psi | Elongation at Max. Stress, percent | Modulus psi | Tensile Strength psi | Elongation at Max. Stress, percent |
| 1 | B | | | | | | |
| | Control | 695 | 100 | 36 | 222 | 40 | 26 |
| | Stained | 585 | 88 | 48.5 | 153 | 44 | 30.5 |
| 2 | D | | | | | | |
| | Control | 780 | 105 | 38.5 | 234 | 51 | 32 |
| | Stained | 540 | 93 | 55.5 | 178 | 38 | 34.5 |
| 3 | E | | | | | | |
| | Control | 735 | 122 | 43 | 285 | 65 | 34.5 |
| | Stained | 565 | 105 | 59.5 | 225 | 53 | 38 |
| 4 | H | | | | | | |
| | Control | 960 | 84 | 48 | 335 | 36 | 18.5 |
| | Stained | 705 | 74 | 66.5 | 252 | 31 | 23.5 |
| 5 | H | | | | | | |
| | Control[4] | 755 | 85 | 51 | 260 | 38 | 27.5 |

TABLE 2-continued

Effect of Antioxidant Stain[1] on Initial Propellant Strain Capabilities as Shown by Mechanical Properties

| Test No. | Formulation[3] | Measured at 77° F.; 0.74 min.$^{-1}$ [2] | | | Measured at 170° F., 0.0074 min.$^{-1}$ [2] | | |
|---|---|---|---|---|---|---|---|
| | | Modulus psi | Tensile Strength psi | Elongation at Max. Stress, percent | Modulus psi | Tensile Strength psi | Elongation at Max. Stress, percent |
| 6 | Stained[4] J | 485 | 73 | 67 | 168 | 27 | 31 |
| | Control | 810 | 91 | 56 | 285 | 40 | 23.5 |
| | Control[4] | 795 | 92 | 42.5 | — | — | — |
| | Stained[4] | 540 | 74 | 61.5 | 203 | 32 | 29 |

[1] In all tests, the antioxidant stain was a mixture of 7 percent PBNA, 7 percent AO-443, 7 percent Santowhite and 2 percent 8HQ dissolved in benzene, 77 percent.
[2] min.$^{-1}$ = in./in./min.
[3] "Control" and "Stained" in each test are the same formulation except that "Control" is unstained.
[4] Dumbbell Test Strip was ⅛" thick, Dumbbell strips of all tests not footnoted by "(4)" were ¼" thic.

As shown in Table 2, the effect of a small amount of antioxidant deposit, or stain, on the propellant burning surface provides a marked change in initial mechanical properties, i.e. prior to aging. Thus, the tests of Table 2 show a marked increase in elongation and reduction in tensile strength and modulus resulting from the antioxidant stain for all propellants tested and which are inclusive of those containing metal oxide, viz., iron oxide or MoO$_3$ oxide and with and without antioxidant added to the formulation. The data of Table 2 demonstrates the marked improvement in strain capability accomplished at the propellant burning surface as evidenced by the increase in elongation and decrease in tensile strength and modulus obtained. Although the improvement in strain capability is due in part to a plasticizing effect of the antioxidant stain, it is to a large degree due to the presence of the antioxidant stain as specifically illustrated hereinafter. The mechanics involved in the effect of the antioxidant stain on strain capability at the burning surface are not clearly understood.

EXAMPLE 3

Type 2 JANAF dumbbell test strips were obtained from blocks of each of cured propellant formulations B, D and H, of Table 1, and tested at different temperature levels for modulus, tensile strength and elongation, before and after aging. The test strips were of two groups, the first of which were surface specimens machined from a propellant block prior to aging and the second of which were block interior specimens machined from the aged block after removal of the outer 1" thereof. The data summarizing the results of these tests are shown in Table 3 following:

TABLE 3

Propellant Resistance to Oxidative Hardening As Shown by Mechanical Properties - Without Antioxidant Stain

| Test No. | Formulation | Days | Dumbbells Aged at 175° F. - Surface[1] | | | | | | Block Aged at 215° F. - Interior[2] | | | | | |
|---|---|---|---|---|---|---|---|---|---|---|---|---|---|---|
| | | | At 77° F., 0.74 min.$^{-1}$ | | | At 170° F., 0.0074 min.$^{-1}$ | | | At 77° F., 0.74 min.$^{-1}$ | | | At 170° F., 0.0074 min.$^{-1}$ | | |
| | | | Modulus psi | Tensile Strength psi | Elongation at Max. Stress percent | Modulus psi | Tensile Strength psi | Elongation at Max. Stress percent | Modulus psi | Tensile Strength psi | Elongation at Max. Stress percent | Modulus psi | Tensile Strength psi | Elongation at Max. Stress percent |
| 8 | B | 0 | 695 | 100 | 36 | 222 | 40 | 26 | 695 | 100 | 36 | 222 | 40 | 26 |
| | | 12 | 810 | 108 | 32.5 | 293 | 41 | 19.5 | 620 | 106 | 35 | 335 | 43 | 17 |
| | | 24 | 805 | 117 | 29 | 401 | 44 | 14 | 565 | 97 | 33 | 320 | 43 | 17.5 |
| | | 48 | 875 | 115 | 22.5 | 502 | 42 | 11 | 460 | 90 | 35 | 281 | 37 | 18.5 |
| 9 | D | 0 | 710 | 113 | 36.5 | 274 | 52 | 27 | 710 | 113 | 36.5 | 274 | 52 | 27 |
| | | 8 | 855 | 113 | 31.5 | 330 | 50 | 20.5 | — | — | — | — | — | — |
| | | 10 | — | — | — | — | — | — | 740 | 98 | 28 | 392 | 45 | 17 |
| | | 16 | 750 | 115 | 27 | 426 | 49 | 15 | — | — | — | — | — | — |
| | | 20 | — | — | — | — | — | — | 770 | 105 | 23.5 | 468 | 46 | 13 |
| | | 24[3] | — | — | 22 | — | — | 11 | — | — | — | — | — | — |
| | | 32 | 1430 | 125 | 12.5 | 930 | 56 | 7.5 | — | — | — | — | — | — |
| | | 40 | — | — | — | — | — | — | 645 | 89 | 23 | 405 | 37 | 13.5 |
| 10 | H | 0 | 960 | 84 | 48 | 333 | 36 | 18.5 | 960 | 84 | 48 | 333 | 36 | 18.5 |
| | | 6 | 785 | 83 | 51 | 304 | 36 | 21.5 | — | — | — | — | — | — |
| | | 12 | 965 | 85 | 36 | 421 | 41 | 15.5 | — | — | — | — | — | — |
| | | 20 | — | — | — | — | — | — | 460 | 76 | 65 | 192 | 34 | 30.5 |
| | | 24 | 1340 | 94 | 21 | 700 | 46 | 9.5 | — | — | — | — | — | — |
| | | 40 | — | — | — | — | — | — | 690 | 76 | 41.5 | 480 | 37 | 12 |

[1] Dumbbell samples, ⅛" thick (propellant surface specimens) cut from propellant block prior to aging.
[2] Dumbbell samples, ⅛" thick (propellant interior specimens) cut from block after aging, i.e. after outside 1" of aged propellant block discarded.
[3] Interpolated data.

The data of Table 3 show that aging at the block interior is not extensive but that there is marked effect of aging at the propellant burning surface, and that effect is greater when a metal oxide is present in the formulation. Thus, the surface tests of formulation B at 77° F. show that the strain retention at 48 days, 175° F. was 63 percent (22.5/36 × 100) whereas the corresponding value for the block test at 215° F. was substantially 100 percent. Similarly, tests for formulation D show a strain retention after 32 days at 175° F. cure of about 34 percent (12.5/36.5 × 100) as compared with a strain retention in the corresponding 215° F. block test except for 40 days of about 64 percent (23/36.5 × 100). Further, the tests of formulation D illustrate the effect on oxidative hardening of the presence of a metal oxide, i.e. as compared with the corresponding data for formulation B. The data shown for formulation H further demonstrate the effect specifically referred to with reference to formulation D.

EXAMPLE 4

Type 2 JANAF dumbbell test strips were machined from cured propellant formulations B and D of Table 1, and were tested, with and without antioxidant stain, for modulus, tensile strength and enlongation at maximum stress, before and after aging. The antioxidant applied was the same as that described in Example 2 and was applied to the dumbbell strip surface in the manner described in Example 2. Data summarizing the results of these tests are shown in Table 4 following:

measurements for control and antioxidant-stain surface as measured at 170° F.

Similarly, for formulation D, containing iron oxide which adversely affects resistance to oxidative hardening, the stained test strips met the 170° F. Low rate elongation requirement for 20 days but the corresponding control, i.e. unstained strips, failed the requirement when aged for longer than 8 days.

EXAMPLE 5

Cured propellant blocks of formulation D in Table 1 were coated with antioxidant stain and aged for varying times at 175° F. Dumbbel test strips (1½" length ×¾" width ×0.275" gauge width, 0.68" effective gauge length and ¼ radius) were prepared from 50-60 mil thick

TABLE 4

Propellant Resistance to Oxidative Hardening As Shown By Mechanical Properties[1] - With Antioxidant Stain

| | | | Measured at 77° F., 0.74 min.$^{-1}$[2] | | | | | | Measured at 170° F., 0.0074 min.$^{-1}$[2] | | | | | |
|---|---|---|---|---|---|---|---|---|---|---|---|---|---|---|
| | | | Modulus psi | | Tensile Strength psi | | Elongation at Max. Stress percent | | Modulus psi | | Tensile Strength psi | | Elongation at Max. Stress percent | |
| Test No. | Formulation | Days[3] | Control | Stained | Control | Stained | Control | Stained | Control | Stained | Control | Stained | Control | Stained |
| 11 | B | 0 | 695 | 585 | 100 | 88 | 36 | 48.5 | 222 | 153 | 40 | 44 | 26 | 30.5 |
| | | 6 | 660 | 385 | 106 | 77 | 37.5 | 61.5 | 249 | 143 | 42 | 30 | 24 | 38.5 |
| | | 12 | 810 | 415 | 108 | 76 | 32.5 | 65 | 293 | 84 | 41 | 30 | 19.5 | 46 |
| | | 24 | 805 | 370 | 117 | 83 | 29 | 54 | 401 | 139 | 44 | 35 | 14 | 33.5 |
| | | 48 | 875 | 485 | 115 | 97 | 22.5 | 49.5 | 502 | 173 | 42 | 39 | 11 | 19.5 |
| 12 | D | 0 | 710 | 540 | 113 | 93 | 36.5 | 55.5 | 274 | 178 | 52 | 38 | 27 | 34.5 |
| | | 8 | 855 | — | 113 | — | 31.5 | — | 330 | — | 50 | — | 20.5 | — |
| | | 10 | — | 390 | — | 92 | — | 56 | — | 205 | — | 44 | — | 33 |
| | | 16 | 750 | — | 115 | — | 27 | — | 426 | — | 49 | — | 15 | — |
| | | 20 | — | 640 | — | 113 | — | 35.5 | — | 326 | — | 49 | — | 21 |
| | | 32 | 1430 | — | 125 | — | 12.5 | — | 930 | — | 56 | — | 7.5 | — |
| | | 40 | — | 1150 | — | 122 | — | 17 | — | 670 | — | 50 | — | 10.5 |

[1]Stained dumbbell test strips (JANAF Type 2, ¼" thick, milled); stained dumbbells were dipped for two seconds in stain solution. "Control" is unstained.
[2]min.$^{-1}$ = in./in./min.
[3]Aging time at 175° F.

The data of Table 4 demonstrate the effect of antioxidant stain on resistance at the propellant burning surface to oxidative hardening for formulations B and D of Table 1; and, again, the effect of the presence of a metal oxide in the formulation as a promoter of oxidative hardening. Nevertheless, in all events, the antioxidant stain is shown to impart a marked increase to resistance at the initial burning surface to oxidative hardening. Thus, formulation B with an antioxidant stain of about $2 \times 10^{-3}$ grams per square centimeter of propellant surface contains no metal oxide and shows an elongation at maximum stress as measured at 77° F. of 49.5 after aging 48 days at 175° F. which compares with an elongation of only 22.5 percent for the control, i.e the corresponding unstained test strip. Further, a stained test strip of formulation D, containing ferric oxide showed about 22 percent elongation after 32 days under the above described aging conditions wherein the control, i.e. unstained, showed a significantly lower elongation (12.5 percent) after 32 days.

A principal requirement for composite propellants is concerned with the elongation at 170° F. at a low rate (0.0074 min$^1$); an elongation of about 20 percent being desired under these conditions. Table 4 shows that the burning surface of formulation B stained with antioxidant in accordance with the invention will meet that requirement after aging for 48 days at 175° F. but with the surface unstained that requirement cannot be met after aging beyond about 12 days. See the elongation microtomed slices from the aged propellant blocks, and were tested for elongation at maximum stress as measured at 77° F. The antioxidant stain was the same as that of Example 2 and was applied with a small, soft haired brush in an amount of about 0.002 gram per square centimeter of initial burning surface.

TABLE 5

Effect of Antioxidant Stain on Mechanical properties as a Function of Depth in Propellant Formulation D

| | Aging at 175° F. | | Measured at 77° F., 0.74 min.$^{-1}$[1] | |
|---|---|---|---|---|
| Test No. | Days | Sampled at Depth mils | Elongation at Maximum Stress, percent | |
| | | | Control | Stained |
| 13 | 0 | 60 | 33 | 55 |
| | | 120 | 33 | 48 |
| | | 180 | 33.5 | 42 |
| | | 240 | 34 | 39 |
| | | 300 | 34 | 39 |
| | | 360 | 34 | 37.5 |
| | | 420 | 34.5 | — |
| 14 | 20 | 60 | 20 | 29 |
| | | 120 | 23.5 | 29.5 |
| | | 180 | 26 | 30 |
| | | 240 | 27.5 | 30 |
| | | 300 | 28 | 30 |
| | | 360 | 28.5 | 30 |
| 15 | 40 | 60 | 10.5 | 19 |
| | | 120 | 12.5 | 15 |
| | | 180 | 15.5 | 17 |
| | | 240 | 18.5 | 19 |

TABLE 6

Effect of Antioxidant Stain[1] on Propellant[2] Plasticization as Shown by Mechanical Properties Mechanical Properties Measured at 77° F., 0.74 in./in./min.

| Test No. | Stain Coating grams/cm.$^2$ | Modulus psi | Tensile Strength psi | Elongation at Max.Stress percent | Elongation (95% of Max. Stress) percent |
|---|---|---|---|---|---|
| 16 | Control[3] | 670 | 97 | 42.5 | 49 |
| 17 | Benzene, None | 630 | 95 | 45 | 51.5 |
| 18 | Benzene-DOA[4], 0.0028 Wt. percent Benzene, 77 DOA, 23 | 390 | 83 | 49.5 | 57 |
| 19 | Benzene-Antioxidant[1] Stain, 0.0026 Wt. percent Benzene, 77 AO Stain, 23 | 490 | 87 | 58 | 68.5 |

[1]Antioxidant stain solution of Example 2. Residual antioxidant stain, 2.6 × 10$^{-3}$ g./cm.$^2$.
[2]Propellant formulation B, Table 1.
[3]Sample unstained.
[4]Residual dioctyl adipate.

Effect of Antioxidant Stain on Mechanical properties as a Function of Depth in Propellant Formulation D

| | Aging at 175° F. | Measured at 77° F., 0.74 min.$^{-(1)}$ | |
|---|---|---|---|
| Test No. | Days | Sampled at Depth mils | Elongation at Maximum Stress, percent |
| | | | Control | Stained |
| | | 300 | 21.5 | 23 |
| | | 360 | 24.5 | 26.5 |
| | | 420 | 26 | 27 |

$^{(1)}$min.$^{-1}$ = in./in./min.

The data of Table 5 demonstrate not only that the antioxidant stain imparts an improved elongation and an increase in resistance at the propellant surface to oxidative hardening but that also the greatest effect occurs at or near the propellant burning surface. We have found that it is generally required for suitable action of the antioxidant stain that the amount of stain be at least about 0.0005 gram per square centimeter.

EXAMPLE 6

Type 2 JANAF dumbbell test strips (1.9" effective gauge length, 0.36" effective gauge width, ¼" radius and ½" thick) were machined from a cured propellant block formation B of Table 1. In addition to one group of the strips as a control (no liquid coating), strips of three different groups were liquid coated respectively with benzene, benzene-dioctyl adipate (DOA) and benzene-antioxidant stain solution of Example 2. Benzene was removed and all strips were tested for modules, tensile strength and elongation at maximum and at 95 percent of maximum. Data summarizing these tests are set forth in Table 6 following:

The data in Table 6 demonstrate that improvement in strain capability at the surface of the propellant, resulting from the antioxidant stain, is particularly due to function of the added antioxidant as a plasticizer. Thus when equal volumes of benzene solutions contain 23 percent by weight of either the antioxidant stain ingredient or of the dioctyl adipate which is a well-known plasticizer, were applied to the surface of the test strips, an increase in elongation and decreases in modulus and tensile strength were obtained. The increase in elongation was appreciably greater than the decrease in each of tensile strength and modulus was somewhat less for the strip containing the antioxidant stain than for the test strip coated with DOA. The change in elongation for the strip coated with added DOA is due to increased plasticization. Accordingly, the change in elongation for the strip stained with the antioxidant is partially due to plasticization but partially due to a mechanism not fully understood.

EXAMPLE 7

Type 2 JANAF dumbbell strips, of dimensions set forth in Example 6, were machined from a cured propellant block of each of formulations B, C and G of Table 1 and stained with selected antioxidants and tested at 77° F., before and after aging, for modulus, tensile strength, and elongation of 95 percent of maximum stress. The antioxidant was in each instance applied to the propellant surface in an amount of about $2 \times 10^3$ grams per square centimeter in the manner illustrated with reference to Example 2. The data summarizing the tests are set forth in Table 7 following:

TABLE 7

Effect of Antioxidant Stain on Propellant Resistance to Oxidative Hardening, As Shown by Mechanical Properties Measured at 77° F., 0.74 min.$^{-1}$ (1). After aging at 205° F.

| Test No. | Formulation[2] | Antioxidant Stain grams/cm.$^2$ | Modulus psi | | | Tensile Strength psi | | | Elongation 95% of Max. Stress percent | | |
|---|---|---|---|---|---|---|---|---|---|---|---|
| | | | Before Aging | Aging Time 1 wk. | 2 wks. | Before Aging | Aging Time 1 wk. | 2 wks. | Before Aging | Aging Time 1 wk. | 2 wks. |
| 20 | C[3] | PBNA, 8 HQ,[4] 2 × 10$^{-3}$ | 570 | 285 | 540[5] | 70 | 65 | 127[5] | 31 | 53.5 | 33.5[5] |

TABLE 7-continued
Effect of Antioxidant Stain on Propellant Resistance to Oxidative Hardening, As Shown by Mechanical Properties
Measured at 77° F., 0.74 min.$^{-1}$ (1), After Aging at 205° F.

| Test No. | Formulation(2) | Antioxidant Stain grams/cm.$^2$ | Modulus psi Before Aging | Aging Time 1 wk. | 2 wks. | Tensile Strength psi Before Aging | Aging Time 1 wk. | 2 wks. | Elongation 95% of Max. Stress percent Before Aging | Aging Time 1 wk. | 2 wks. |
|---|---|---|---|---|---|---|---|---|---|---|---|
| 21 | B | Wt. percent PBNA, 83 8 HQ, 17 Same as for Test 20, 2 × 10$^{-3}$ | 790 | 550 | — | 77 | 67 | — | 53.5 | 89.5 | — |
|  |  | Same as for Test 20, 5 × 10$^{-3}$ | 790 | 195 | — | 77 | 38 | — | 53.5 | 135 | — |
| 22 | B | PBNA, AO-443, 8 HQ, 2 × 10$^{-3}$ Wt. percent PBNA, 45 AO-443, 45 8 HQ,10 | 790 | 640 | — | 77 | 74 | — | 53.5 | 81 | — |
| 23 | B | PBNA, AO-443, 2 × 10$^{-3}$ Wt. percent PBNA, 50 AO-443, 50 | 790 | 600 | — | 77 | 75 | — | 53.5 | 71 | — |
| 24 | G | AO-443, TMTS,$^{(6)}$ 2 × 10$^{-3}$ Wt. percent AO-443, 50 TMTS, 50 | 790 | 890 | 1670$^{(7)}$ | 77 | 80 | 108$^{(8)}$ | 53.5 | 54 | 18 |

$^{(1)}$min.$^{-1}$ = in./in./min.
$^{(2)}$See Table 1
$^{(3)}$Also contains 0.2 weight percent lecithin
$^{(4)}$8 HQ = 8 hydroxyquinoline
$^{(5)}$After 3 weeks
$^{(6)}$TMTS = tetramethyl thiuramdisulfide
$^{(7)}$2480 after 3 weeks
$^{(8)}$125 after 3 weeks The invention is particularly advantageously applied to composite propellant rocket motors exposed to elevated temperatures for long periods of time and requiring high mass ratio which generally is obtained utilizing a minimum port diameter. In practice a stain solution of selected propellant antioxidant material is applied to the port area of the propellant motor by brushing, spraying, or by an immersion technique to obtain a suitable stain for imparting improved resistance to thermal oxidative hardening and strain capability at the initial burning surface.

The selection of the antioxidant solution depends upon a number of variables which in turn are dependent on the particular formulation and processing contemplated. Solubility of the antioxidant and propellant ingredients in the selected solvent of the stain solution are important factors. Flammability and toxicity problems arise in certain embodiments but are often offset by the volatility of the solvent which enables convenient removal from the propellant once the stain is applied.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. In a composite propellant wherein the binder component comprises a carboxy terminated rubber selected from the group consisting of elastomeric polymers of at least one conjugated diene containing 4 to 8 carbon atoms and elastomeric polymers of at least one olefin containing 2 to 4 carbon atoms, cured with an epoxide curing agent therefor, the improvement comprising a coating of a propellant antioxidant material on an initial burning surface of said propellant in an amount sufficient to impart to said burning surface an increase in strain capability and an increase in resistance to oxidative hardening and to provide at least about 0.0005 gram/square centimeter of said surface.

2. A composite propellant of claim 1 wherein the amount of antioxidant on said surface is within the range of from 0.0005 to 0.1 gram/square centimeter of said surface.

3. A composite propellant of claim 2 wherein said antioxidant material is a mixture of at least one propellant antioxidant of the free radical decomposer type and at least one propellant antioxidant of the hydroperoxide group decomposer type.

4. A composite propellant of claim 3 wherein said antioxidant mixture also contains a chelating agent.

5. A composite propellant of claim 2 wherein said antioxidant material is a mixture of a phenyl-β-naphthylamine, N,N'-bis(1,4-dimethylpentyl)p-phenylenediamine, 4,4'-thio-bis(6-tert-butyl-meta-cresol) and 8 hydroxyquinoline.

6. A composite propellant of claim 3 wherein said mixture contains at least 8 weight percent of each individual antioxidant.

7. A composite propellant of claim 2 wherein said antioxidant material is a mixture of phenyl-β-naphthylamine, N,N'-bis(1,4-dimethylpentyl)p-phenylenediamine and thiodiphenylamine.

8. A composite propellant of claim 2 wherein said antioxidant material is a mixture of phenyl-β-naphthylamine, N,N'-bis(1,4-dimethylpentyl)p-phenylenediamine and 4,4'-thio-bis (6-tert-butyl-meta-cresol).

9. A composite propellant of claim 2 containing, on a weight basis, from 5–20 percent of said binder component and from 60–90 percent of a solid oxidizer.

10. A propellant of claim 9 wherein said epoxy curing agent is a mixture of difunctional epoxides and trifunctional epoxides, and wherein the mole ratio of the dioxide to trioxide is within the range of from 15:1 to 1:1.

11. A propellant of claim 10 wherein said carboxy terminated rubber is a carboxy terminated butadiene, and wherein the mole ratio of epoxy groups to carboxy groups is within the range of from 0.9:1 to 2:1.

12. A propellant of claim 10 wherein the carboxy terminated rubber is a polymer selected from the group consisting of a carboxy terminated polybutadiene and carboxy terminated polyisobutylene having a molecular weight within the range of from about 1000 to about 20,000.

13. A propellant of claim 9 wherein said solid oxidizer component is ammonium perchlorate.

14. A propellant of claim 13 containing from 70 to about 90 weight percent of said ammonium perchlorate and from 5 to about 10 weight percent of a particulate metal fuel.

15. In a composite rocket motor, wherein the binder system of the propellant comprises a carboxy terminated rubber selected from the group consisting of elastomeric polymers of at least one conjugated diene containing 4 to 8 carbon atoms and elastomeric polymers of at least one olefin containing 2 to 4 carbon atoms, cured with an epoxide curing agent therefor, the improvement comprising a stain of a propellant antioxidant material on an initial burning surface of said propellant in an amount sufficient to impart to said burning surface an increase in strain capability and an increase in resistance to oxidative hardening and to provide at least about 0.0005 gram/square centimeter of said surface; and said propellant having a mass ratio increased as a function of the presence of said stain.

16. In a propellant motor of claim 15, from 0.0005 to 0.01 grams of said stain per square centimeter of said burning surface.

* * * * *